US010943246B1

United States Patent
Biggs et al.

(10) Patent No.: US 10,943,246 B1
(45) Date of Patent: Mar. 9, 2021

(54) SIGNED IDENTIFIERS FOR CONFIRMING OFFER ELIGIBILITY

(71) Applicant: Amazon Technologies, Inc., Seattle, WA (US)

(72) Inventors: Jody David Biggs, Seattle, WA (US); Vinod Murli Mamtani, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 924 days.

(21) Appl. No.: 15/195,913

(22) Filed: Jun. 28, 2016

(51) Int. Cl.
*G06Q 30/00* (2012.01)
*G06Q 30/02* (2012.01)
*G06Q 20/38* (2012.01)

(52) U.S. Cl.
CPC ....... *G06Q 30/0222* (2013.01); *G06Q 20/387* (2013.01); *G06Q 20/3825* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 8,758,111 B2 * | 6/2014 | Lutnick | ................... | G07F 17/34 463/16 |
| 2002/0049906 A1 * | 4/2002 | Maruyama | ........... | G06Q 20/027 713/176 |
| 2010/0122274 A1 * | 5/2010 | Gillies | ................... | G06Q 30/02 725/2 |
| 2013/0097664 A1 * | 4/2013 | Herz | ...................... | G06Q 10/10 726/1 |
| 2013/0191250 A1 * | 7/2013 | Bradley | ............. | G06Q 30/0623 705/26.61 |
| 2014/0143889 A1 * | 5/2014 | Ginter | ..................... | G06F 21/42 726/27 |
| 2015/0039462 A1 * | 2/2015 | Shastry | .............. | G06Q 30/0633 705/26.7 |
| 2015/0088754 A1 * | 3/2015 | Kirsch | .............. | G06Q 20/0855 705/71 |

(Continued)

FOREIGN PATENT DOCUMENTS

| | | | | |
|---|---|---|---|---|
| JP | 2007282281 A | * | 10/2007 | ............. G07D 7/004 |
| JP | 2014216881 A | * | 11/2014 | ............. G06Q 10/10 |
| WO | WO-2004107132 A2 | * | 12/2004 | ........... G06F 21/606 |

OTHER PUBLICATIONS

• Amazon. Amazon Web Services Certification Practice Statement Version 1.0.1. (Jun. 8, 2015). https://www.amazontrust.com/repository/cps-1.0.1.pdf (Year: 2015).*

(Continued)

*Primary Examiner* — James A Reagan
(74) *Attorney, Agent, or Firm* — Knobbe, Martens, Olson & Bear, LLP

(57) ABSTRACT

Systems and methods are provided for generating a signed identifier associated with an item offer and a user account. When the identifier is submitted to a computing system to redeem an associated offer, a signature within the identifier may be analyzed to confirm that the identifier has not been modified. An item discount associated with an item offer identified in the identifier may then be applied within the identified user's account based on offer details retrieved from an electronic data store.

17 Claims, 6 Drawing Sheets

(56) References Cited

U.S. PATENT DOCUMENTS

2016/0255067 A1* 9/2016 Keromytis .......... H04L 63/0807
726/7

OTHER PUBLICATIONS

• IBM. Implementing CICS Web Services. (Oct. 2007) http://www.redbooks.ibm.com/redbooks/pdfs/sg47206.pdf (Year: 2007).*
• Hampiholi, Brinda Badarinath. Secure & privacy-preserving eID systems with Attribute-based credentials. (Sep. 15, 2013). http://www.cs.ru.nl/~brinda/publications/Brinda_Master_thesis_ru.pdf (Year: 2013).*
"Using Signed URLs, Amazon CloudFront," retrieved Jun. 3, 2016 from http://docs.aws.amazon.com/AmazonCloudFront/latest/DeveloperGuide/private-content-signed-urls.html.
"What is URL Signing?," retrieved Jun. 3, 2016 from https://www.limestonenetworks.com/support/knowledge-center/24/112/what_is_url_signing.html.

* cited by examiner

SIGNED IDENTIFIERS FOR CONFIRMING OFFER ELIGIBILITY

BACKGROUND

Retailers and merchants involved in electronic commerce often provide user interfaces from which a user may search or browse an electronic catalog for products or other items available for purchase. A retailer or merchant involved in electronic commerce may additionally provide users with discounts or limited time offers, such as offering a 10% discount on purchase of certain items by a certain date or for orders meeting some predetermined criteria. In some instances, for example, a retailer may prompt a consumer during an ordering or checkout process to indicate whether the consumer has any discount codes to be applied to the consumer's order. Often, such discount codes may be redeemed by any consumer who is aware of the code. For example, a first consumer that is provided a discount code by the retailer may inform a second consumer of the discount code such that the second consumer may redeem the discount code instead of, or in addition to, the first consumer redeeming the discount code.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
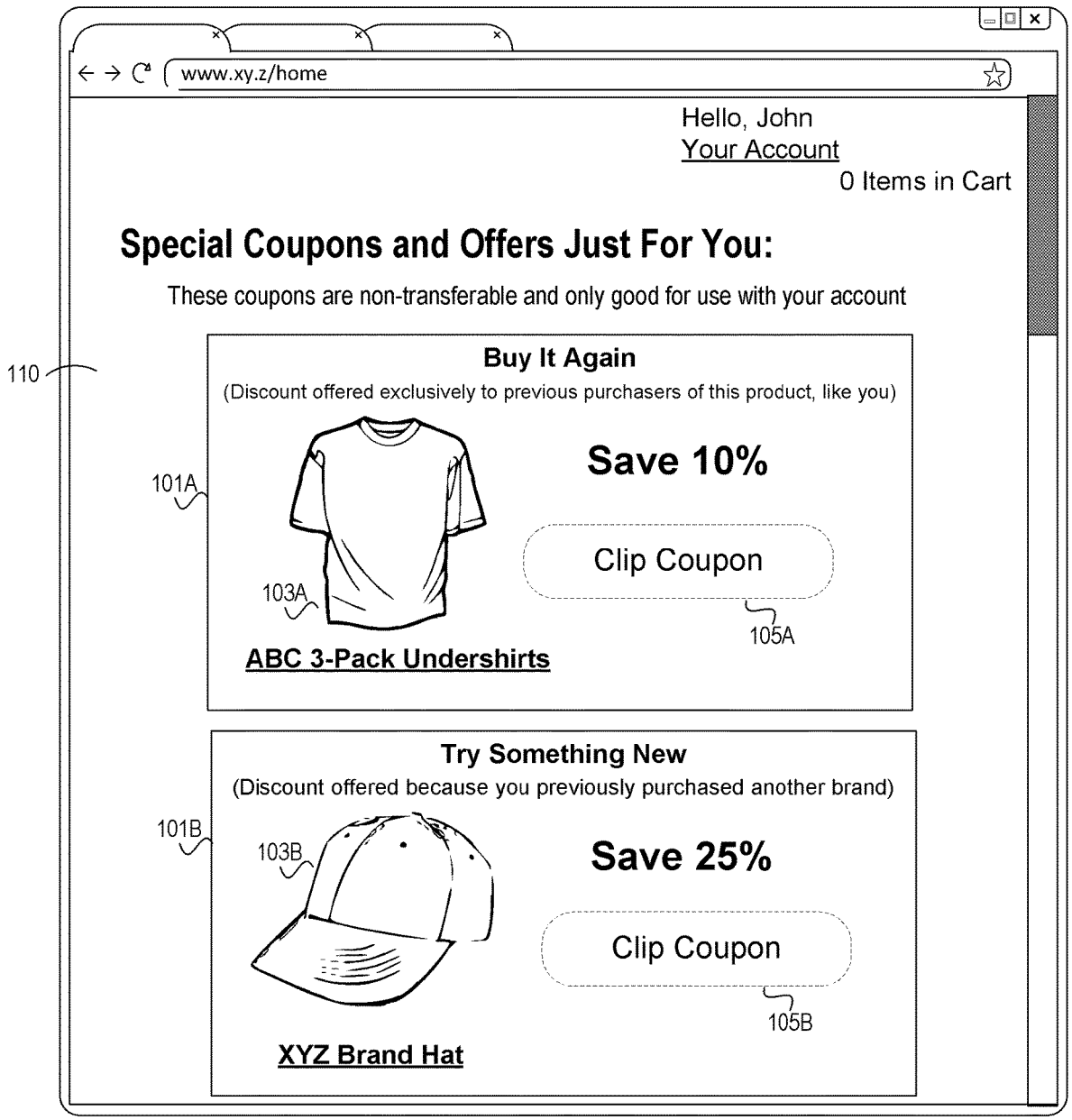
FIGS. 1 and 2 are pictorial diagrams depicting example user interface representations illustrating user-specific offers associated with signed identifiers.

Generally described, aspects of the present disclosure relate to providing an identifier, such as a Uniform Resource Identifier ("URI"), that includes signature data and enables a user to receive a specified offer following system validation of information in the identifier. A generated identifier, as disclosed herein, may be used by a computing system to provide a user-specific offer to a user without necessarily requiring that the computing system store offer information specific to each user. For example, a generated URI may include sufficient information within the URI itself for the computing system to later determine, from the URI, the user for whom the offer was extended. The URI may additionally include an embedded cryptographic signature generated by the computing system to ensure that the user identification information within the URI is not tampered with or modified prior to submission of the URI for offer redemption.

An identifier, as used herein, may be a text string, a URI, a Uniform Resource Locator ("URL"), an address, and/or other data that can be interpreted by a browser or other program operating on a computing device in order to request associated content from a server or other system. A signature, as disclosed herein, may be in a form such that it may be appended to the identifier or inserted within the identifier. For example, if the identifier is a URI in a given embodiment, a signature may be generated in the form of an alphanumeric string that can be appended to the end of, or embedded within, the text string that is to be interpreted as a URI by a browser or other program.

In one embodiment, an offer service, as described herein, may receive item offer information from a computing device operated by a vendor, manufacturer, distributor, seller or other party involved in the sale of items. The item offer information may include information identifying one or more items for which the offer may apply, a discount associated with the offer (which may be in the form of a percentage off the purchase price, or a dollar amount value, among others), and eligible user criteria describing criteria that should be met by any user for whom the offer will be presented. The offer service may then determine one or more user accounts that meet the eligible user criteria, such as by comparing user purchase history and/or other user information to the criteria. The offer service may additionally store offer details associated with the offer in an electronic data store, which may be indexed in a manner whereby the offer details may be later retrieved based on unique offer identification information stored with each offer.

For an individual user account that qualifies for the offer, the offer service may then generate an identifier that includes data identifying the item offer and data identifying the user account. The identifier may further include a signature that the offer service generates based on the data identifying the item offer and the data identifying the user account. For example, the signature may be a checksum or hash value determined based at least in part on the other data included within the identifier. This identifier may then be included in association with a selectable option on a page or user interface sent to a client computing device associated with the user account. For example, the page may prompt the user to select the selectable option in order to redeem the offer, which may cause the client computing device to send the identifier to the offer service in association with a subsequent page request.

In one embodiment, when the offer service receives the identifier from the client computing device, the offer service may validate the received identifier based at least in part on the signature within the received identifier. For example, the offer service may confirm that the signature in the identifier is consistent with the user account and offer that are identified in the identifier. If the offer service determines that the identifier has not been altered and that the client computing device is associated with the user account identified in the received identifier (such as based on a cookie and/or previous account login from the client computing device), the offer service may then apply the discount associated with the item offer information to the item within an electronic shopping cart or an order associated with the user account.

In some embodiments, offers as described herein may be particularly useful with respect to items that are considered likely candidates for repeat purchase (such as shampoo, dishwasher detergent, and cereal, among others). Vendors may be interested in offering discounts exclusively to previous purchasers of such items in order to increase such users' loyalty to a given brand or product type. Enticing such repeat customers by offering discounts may additionally reduce risk for a vendor due to uncertainty of future sales, or by allowing the vendor to shed excess inventory.

Traditional physical retail stores do not typically have the ability to offer such discounts that are only redeemable by consumers meeting certain past purchase criteria, as a given consumer's previous purchase information would typically be unavailable to the retail store, and because traditional coupons are typically redeemable by anyone physically in possession of a valid coupon. In contrast, aspects of the present disclosure, according to some embodiments, enable an offer identifier to be generated only for specific users, and ensure that only those users for whom an identifier is generated are able to redeem the offer using the identifier generated for that specific user's account.

FIG. 1 is a pictorial diagram depicting an illustrative user interface 110 that includes presentation of user-specific offers 101A and 101B. As shown, the user interface 300 is displayed via a browser operating upon a client computing device utilized by a user. The user of the computing device may have previously logged into a user account maintained for the user by a retail service. In turn, the retail service or an associated offer service, as described herein, may have generated the illustrated page to include offers specifically for the given user based on the user's account information and offer criteria associated with various item offers, discounts, or electronic coupons.

While not visible in the displayed page, the code of the page may associate the selectable options 105A and 105B (reading "Clip Coupon") with URIs or other identifiers that were generated by an offer service specifically for the user. For example, the user may qualify for the offer 101A for item 103A because the offer service determined from the user's purchase history that he previously purchased the item 103A. As another example, the user may qualify for the offer 101B for item 103B because the offer service determined from the user's purchase history that he previously purchased an item from a competing brand or company as item 103A.

The offer criteria may have been established, in some embodiments by an administrator of the offer service, a vendor, a distributor, a manufacturer, a seller, and/or other party. As will be described further below, the identifiers associated with options 105A and 105B within the code of the page may include data identifying the user's account, data identifying the respective offer, and a signature that can be used by the offer service to confirm that the identifier is valid and has not been altered by anyone prior to the identifier being sent back to the offer service in response to a user selection of one of the selectable options 105A or 105B.

Figure 2:
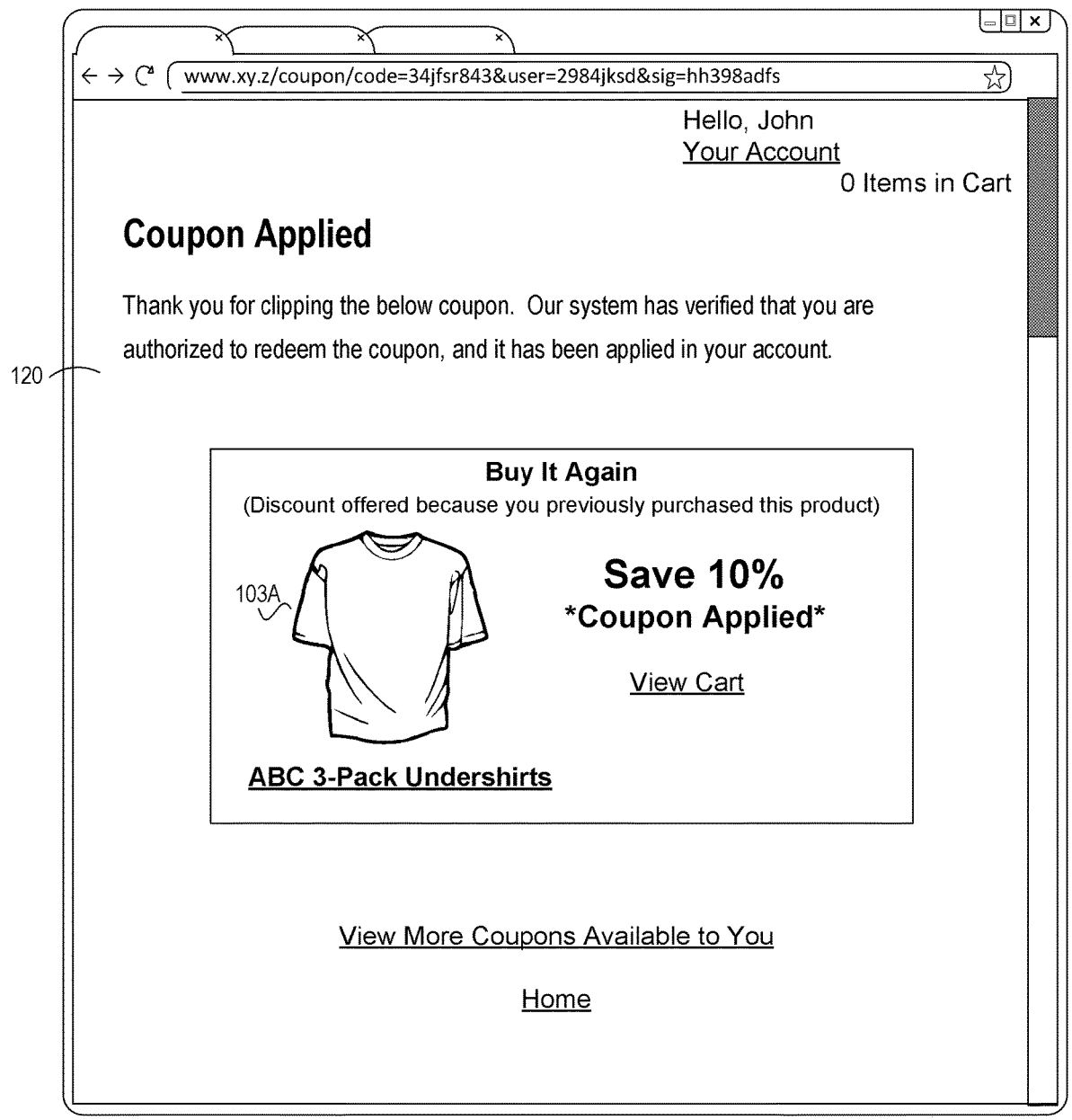

FIG. 2 is a pictorial diagram depicting an illustrative user interface 120 confirming redemption of a user-specific offer associated with a signed identifier. User interface 120 may have been generated by an offer service, as described herein, following user selection of selectable option 105A (reading "Clip Coupon") associated with offer 101A in user interface 110 of FIG. 1. In response to the user selection, a browser operating upon the user's computing device may have caused the user's computing device to send a network request for content having the identifier associated with selectable option 105A in the page code for the illustrative user interface 110 of FIG. 1. In the example illustrated in FIG. 2, the identifier associated with the offer 101A and the given user may be "http://www.xy.z/coupon/code=34jfsr843&user=2984j ksd&sig=hh398adfs." Within this example identifier, "34jfsr843" may identify the offer, "2984jksd" may identify the user, and "hh398adfs" may be the signature that was previously generated by the offer service for inclusion in the generated identifier.

Upon the offer service receiving the identifier back in the network request from the user's computing device, the offer service may have analyzed the identifier's signature to confirm or validate that it is consistent with the identifier's user identification data and offer identification data, as will be described below. Thus, the offer service is able to confirm that the identifier has not been tampered with, such as by a nefarious individual swapping out different user identification information within the identifier in an attempt to allow a user other than the intended recipient to claim the offer. Based on this confirmation and a determination that the identifier is being submitted in connection with the correct user account, the offer service may have retrieved offer details associated with the offer (based on the offer identification information within the identifier) to determine the discount to be applied to item 103A. As illustrated, the offer service has applied a 10% discount to item 103A as a result, which may then be viewed in the user's electronic shopping cart, in an order checkout page, and/or in another page or user interface associated with the user's account.

Figure 3:
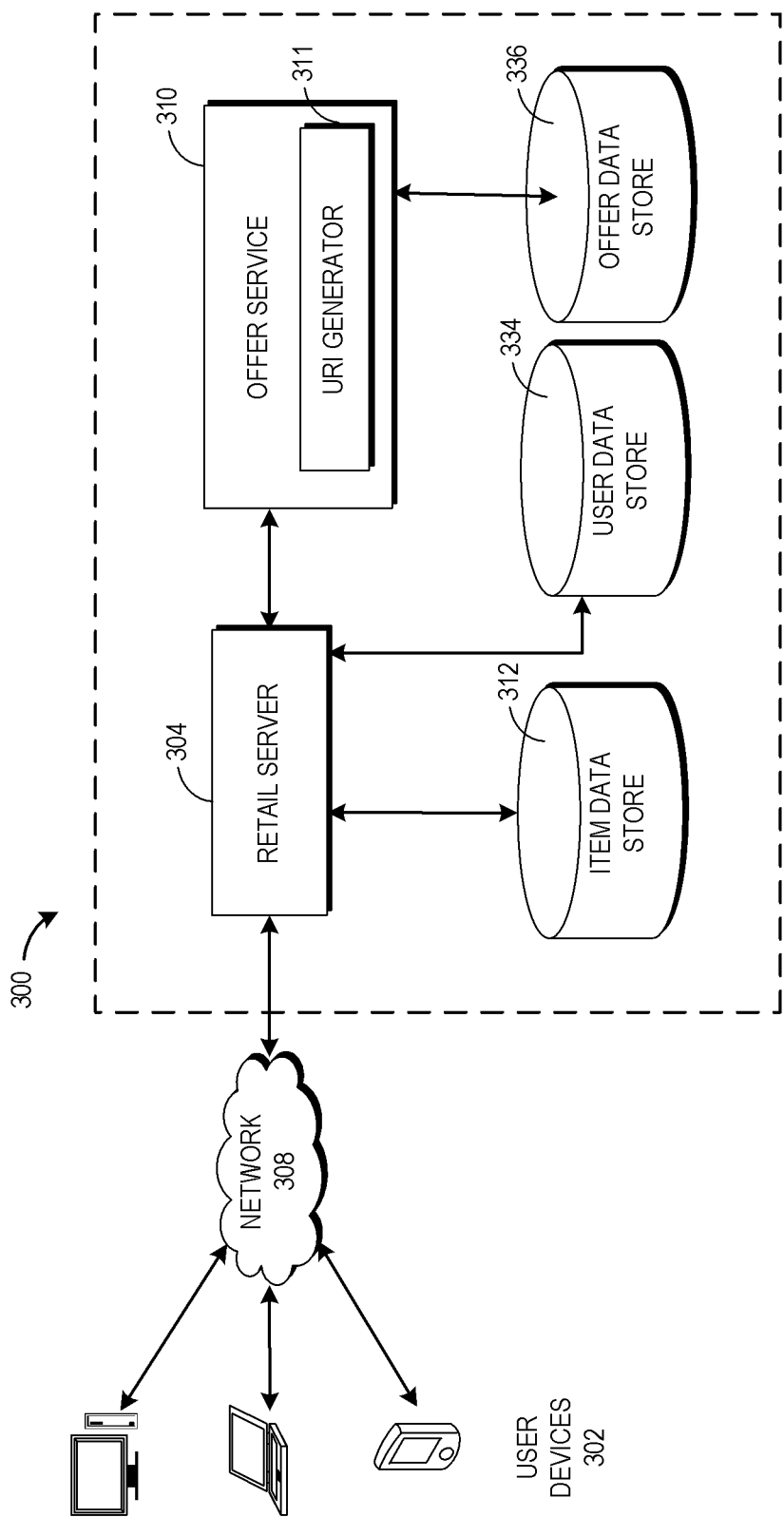
FIG. 3 is a block diagram depicting an illustrative operating environment for presenting users with offers, generating signed identifiers, and validating signed identifiers.

FIG. 3 is a block diagram depicting an illustrative operating environment 300 for presenting users with offers, generating signed identifiers, and validating signed identifiers. The illustrative operating environment shown in FIG. 3 includes an electronic catalog system 300 that enables users to browse items (such as items listed in an electronic catalog for purchase). The catalog system 300 may include an offer service 310, as well as an associated URI generator 311 and offer data store 336, which may be used to implement various aspects of the present disclosure, such as generating and validating user-specific offer identifiers. The offer data store 336 may include information regarding a number of different items offers, which may include information regarding a vendor associated with each offer, user criteria describing users that may be found eligible to receive or redeem the offer, the item(s) that the offer may be applied towards, a discount amount or percentage discount, a maximum number of times the offer may be extended, a maximum dollar amount that may be collectively redeemed by users, an expiration time, and/or other information. The catalog system 300 may also include one or more retail servers 304 that facilitate electronic browsing and purchasing of items using various user devices, such as user computing devices 302 (which may alternatively be referred to herein as client computing devices). User computing devices 302 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

Retail server 304 may be connected to and/or in communication with an item data store 312 that stores item information regarding a number of items, such as items listed in an electronic catalog as available for browsing and/or purchasing via the retail server 304. Item data stored in item data store 312 may include any information related to each item. For example, item data may include, but is not limited to, price, availability, title, item identifier, item images, item description, item attributes, item text, item reviews, etc. The item data store 312 may additionally store digital content items (e.g., audiobooks, electronic books, music, movies, multimedia works, etc.). The retail server 304 may also be connected to or in communication with user data store 334, which may store user data associated with users of retail server 304. The stored user data may include account information, purchase history, browsing history, item reviews and ratings, personal information, location information, billing information, etc.

In some embodiments, each of the item data store 312, user data store 334 and/or offer data store 336 may be local to retail server 304, may be remote from both offer service 310 and retail server 304, and/or may be a network-based service itself. The illustrated data stores may be embodied in hard disk drives, solid state memories, any other type of non-transitory computer-readable storage medium, and/or a file, a database, a relational database, in-memory cache, and/or stored in any such non-transitory computer-readable medium accessible to the retail server 304 and/or offer service 310. The data stores may also be distributed or partitioned across multiple local and/or storage devices, or combined into a single storage device, without departing from the spirit and scope of the present disclosure.

In the environment shown in FIG. 3, a user of the catalog system 300 may utilize a user computing device 302 to communicate with the retail server 304 via a communication network 308, such as the Internet or other communications link. The network 308 may be any wired network, wireless network or combination thereof. In addition, the network 308 may be a personal area network, local area network, wide area network, cable network, satellite network, cellular telephone network, etc. or combination thereof. For example, the network 308 may be a publicly accessible network of linked networks, possibly operated by various distinct parties, such as the Internet. In some embodiments, the network 308 may be a private or semi-private network, such as a corporate or university intranet. The network 308 may include one or more wireless networks, such as a Global System for Mobile Communications (GSM) network, a Code Division Multiple Access (CDMA) network, a Long Term Evolution (LTE) network, or some other type of wireless network. The network 308 may use protocols and components for communicating via the Internet or any of the other aforementioned types of networks.

The catalog system 300 is depicted in FIG. 3 as operating in a distributed computing environment including several computer systems that are interconnected using one or more computer networks. The catalog system 300 could also operate within a computing environment having a fewer or greater number of devices than are illustrated in FIG. 3. Thus, the depiction of catalog system 300 in FIG. 3 should be taken as illustrative and not limiting to the present disclosure. For example, the catalog system 300 could implement various Web services components and/or peer-to-peer network configurations to implement at least a portion of the processes described herein.

In brief, the retail server 304 is generally responsible for providing front-end communication with various user devices, such as a user computing device 302, via network 308. The front-end communication provided by the retail server 304 may include generating text and/or graphics, possibly organized as a user interface using hypertext transfer or other protocols in response to information inquiries received from the various user devices. The retail server 304 may obtain information on available items from one or more data stores, such as item data store 312, as is done in conventional electronic commerce systems. In certain embodiments, the retail server 304 may also access item data from other data sources, either internal or external to catalog system 300. In some embodiments other than that illustrated in FIG. 3, the retail server 304 may include or implement an offer service, as described herein, such that a separate offer service 310 may not be present in certain embodiments.

Figure 4:
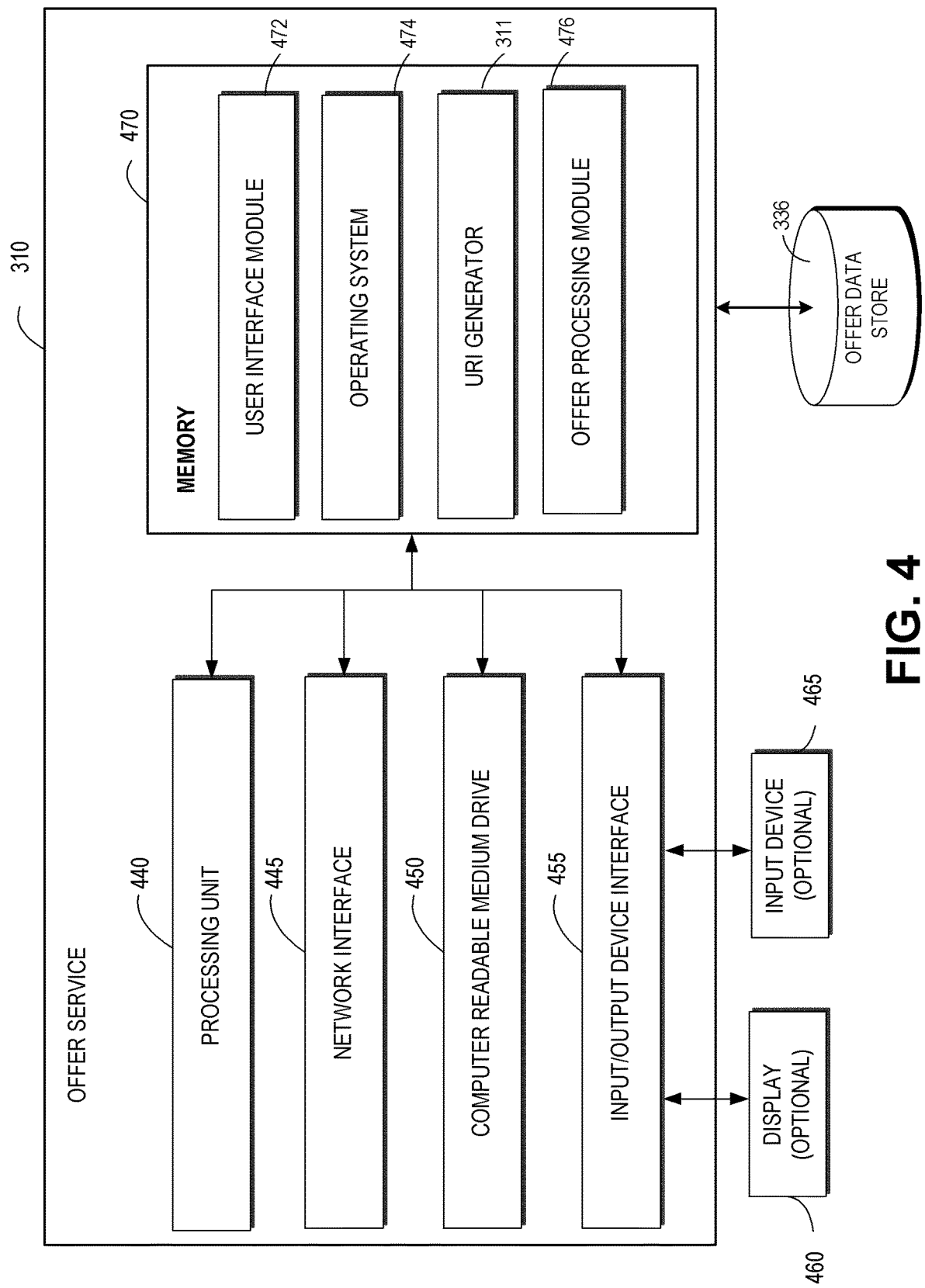
FIG. 4 depicts a general architecture of an example computing device providing an offer service.

FIG. 4 depicts a general architecture of a computing system (referenced as offer service 310) configured to implement various aspects of the present disclosure. The general architecture of the offer service 310 depicted in FIG. 4 includes an arrangement of computer hardware and software components. The offer service 310 may include many more (or fewer) elements than those shown in FIG. 4. It is not necessary, however, that all of these generally conventional elements be shown in order to provide an enabling disclosure. As illustrated, the offer service 310 includes a processing unit 440, a network interface 445, a computer readable medium drive 450, an input/output device interface 455, a display 460, and an input device 465, all of which may communicate with one another by way of a communication bus. The network interface 445 may provide connectivity to one or more networks or computing systems. The processing unit 440 may thus receive information and instructions from other computing systems or services via the network 308. The processing unit 440 may also communicate to and from memory 470 and further provide output information for an optional display 460 via the input/output device interface 455. The input/output device interface 455 may also accept input from the optional input device 465, such as a keyboard, mouse, digital pen, microphone, touch screen, gesture recognition system, voice recognition system, gamepad, accelerometer, gyroscope, or other input device.

The memory 470 may contain computer program instructions (grouped as modules or components in some embodiments) that the processing unit 440 executes in order to implement one or more embodiments. The memory 470 generally includes RAM, ROM and/or other persistent, auxiliary or non-transitory computer-readable media. The memory 470 may store an operating system 474 that provides computer program instructions for use by the processing unit 440 in the general administration and operation of the offer service 310. The memory 470 may further include computer program instructions and other information for implementing aspects of the present disclosure. For example, in one embodiment, the memory 470 includes a user interface module 472 that generates user interfaces (and/or instructions therefor) for display upon a computing device, e.g., via a navigation interface such as a browser or application installed on the computing device. In addition, memory 470 may include or communicate with offer data store 336 and/or one or more other data stores, as discussed above with reference to FIG. 3.

URI generator 311 may generate identifiers associated with offers, as described herein, including generating signatures for inclusion in the identifiers. Offer processing module 476 may receive generated identifiers received from client computing devices, validate the identifiers, and apply discounts to items based on the identifier information. While URI generator 311 and offer processing module 476 are shown in FIG. 4 as part of the offer service 310, in other embodiments, all or a portion of the URI generator 311 and/or offer processing module 476 may be implemented by the retail server 304 and/or another computing device. In some embodiments, the retail server 304 may include several components that operate similarly to the components illustrated as part of the offer service 310, including a user interface module, URI generator, offer processing module, processing unit, computer readable medium drive, etc. In some such embodiments, the offer service 310 may not be needed.

Figure 5:
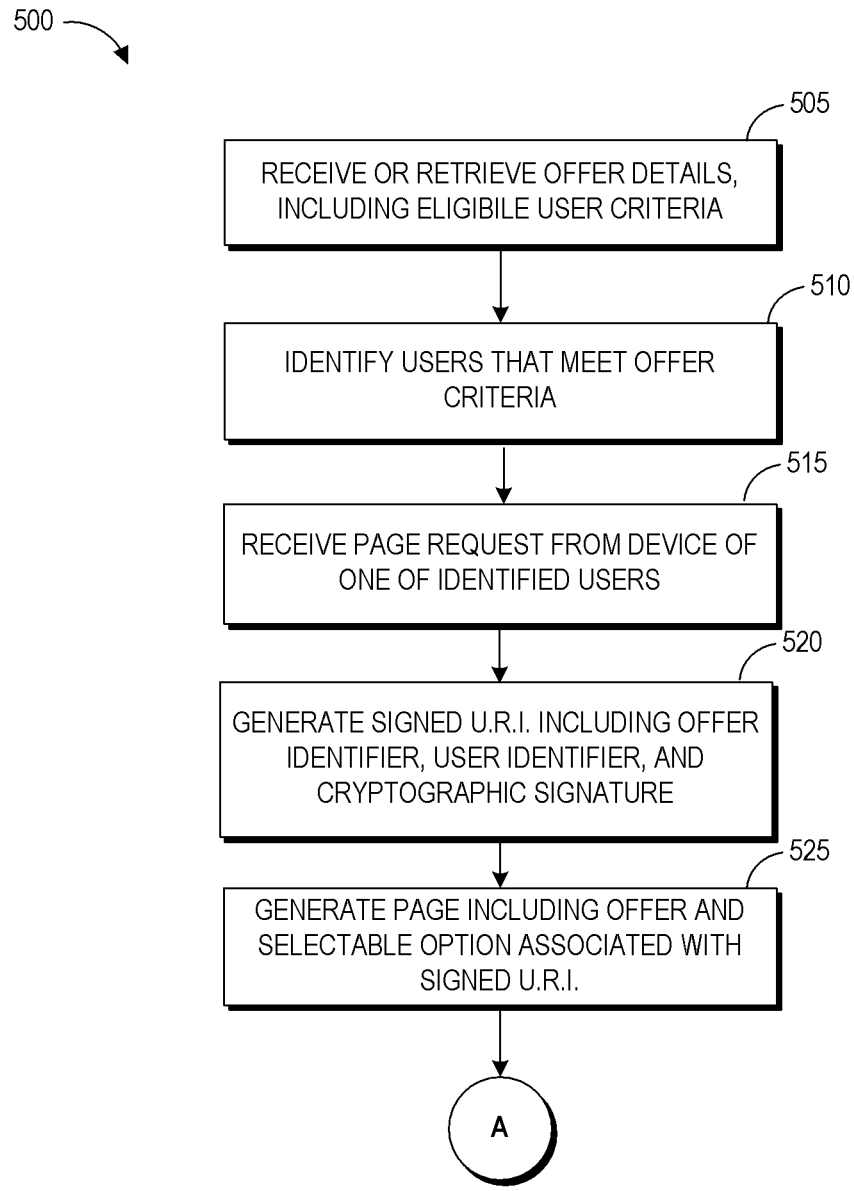
FIG. 5 is a flow diagram depicting an illustrative method for generating a signed identifier associated with an offer.

FIG. 5 is a flow diagram depicting an illustrative method 500 implemented by the offer service 310 for generating a signed identifier associated with an offer. The illustrative method begins at block 505, where the offer service 310 receives or retrieves offer details, including eligible user criteria that describes attributes of users or user accounts that should be found to qualify for the offer. In some embodiments, the offer details for the offer may be retrieved from a data store, such as offer data store 336, in the case of an offer that was previously set up or initiated. In other embodiments, the offer details may be received from a computing device, such as a computing device operated by a vendor associated with an item for which the offer will apply. For example, the offer service may generate one or more user interfaces for presentation to an offer initiator (such as a vendor, administrator, seller, advertiser, or other party) that enable the offer initiator to tailor or design an offer based on a number of options presented by the offer service.

The offer details may include, in some embodiments, user criteria describing users that may be found eligible to receive or redeem the offer, the item(s) that the offer may be applied towards, a discount amount or percentage discount, a maximum number of times the offer may be extended, a maximum dollar amount that may be collectively redeemed by users, an expiration time, and/or other information. The eligible user criteria may describe the users or user accounts for which the offer is valid based on a number of different criteria types, depending on the embodiment. For example, the user criteria may include demographic data (such as indicating that the offer should be presented to users meeting a certain age, gender, location or other demographic data), browsing history (such as users that previously viewed item information associated with certain items), purchase history (such as users who previously purchased a given item, a given brand of items, or a given type of item), membership criteria (such as membership in a given club, loyalty program, opting in for certain account upgrades, or the like), and/or other criteria.

Next, at block 510, the offer service 310 identifies one or more users or user accounts that meet the offer criteria. The user accounts may be identified, for example, by comparing the offer criteria with corresponding user account details retrieved from user data store 334. For example, if the offer criteria indicates that the offer should be presented to users that previously purchased a specific item, the offer service 310 may search purchase history information in the user data store 334 to identify user accounts belonging to users that previously purchased the given item. When the offer service 310 has identified an eligible user, in some embodiments, the offer service 310 may store a flag or other information in association with the user account indicating that the user is eligible for the given offer. This flag or other data may then by checked by the offer service 310 the next time offers are to be presented to the given user (such as the next time a page is requested from a client computing device logged into the user's account). In other embodiments, the offer service may send an email, text message, push notification, or other notification that includes the offer identifier to a device associated with the user's account.

At block 515, the offer service 310 may receive a page request from a client computing device that is logged into one of the user accounts that was determined at block 510 to be eligible for the given offer. The user account associated with the client computing device may be determined, for example, by a cookie or other data file associated with a user's browsing history that is sent by the client computing device to the retail server 304 in association with a page request. The offer service may determine, based on a flag or other indication stored in association with the user's account, that the offer should be presented to the user within the page or other user interface to be returned to the client computing device for display in response to the page request.

At block 520, the offer service 310 generates a signed identifier associated with the offer and the user's account. The identifier may include, in some embodiments, data identifying the offer (such as by inclusion of an offer identification number or identification string that has been associated with the associated offer details in offer data store 336) and data identifying the user account (such as by inclusion of a user identification number or string associated with the user account in user data store 334). In some embodiments, the identifier may include other information associated with the offer, such as an expiration time for the offer, a generation time indicating when the identifier was generated, and/or other information.

The generated identifier may include a cryptographic signature or other signature data generated by the offer service 310. The signature may be subsequently used by the offer service to confirm that when the offer identifier is later received from a client computing device for offer redemption, the received identifier is in fact a valid identifier that was generated by the offer service and has not been altered or tampered with by any third party. The signature may be generated in a number of ways, depending on the embodiment. For example, the signature may be generated as a checksum of the other data in the identifier (such as a checksum based on the data identifying the user account and the data identifying the offer), or as a hash value based on the other data in the identifier. For example, the well-known MD5 hash function may be used, in some embodiments, in generating the signature based at least in part on other data in the identifier. In some embodiments, a cryptographic signature may be generated utilizing a private key that may then be subsequently used by the offer service 310 in decrypting the signature. Once the identifier is generated, at block 525, the identifier may be included within code of a page in association with a selectable option that may be selected by the user to redeem the offer, such as described above with reference to FIG. 1.

Figure 6:
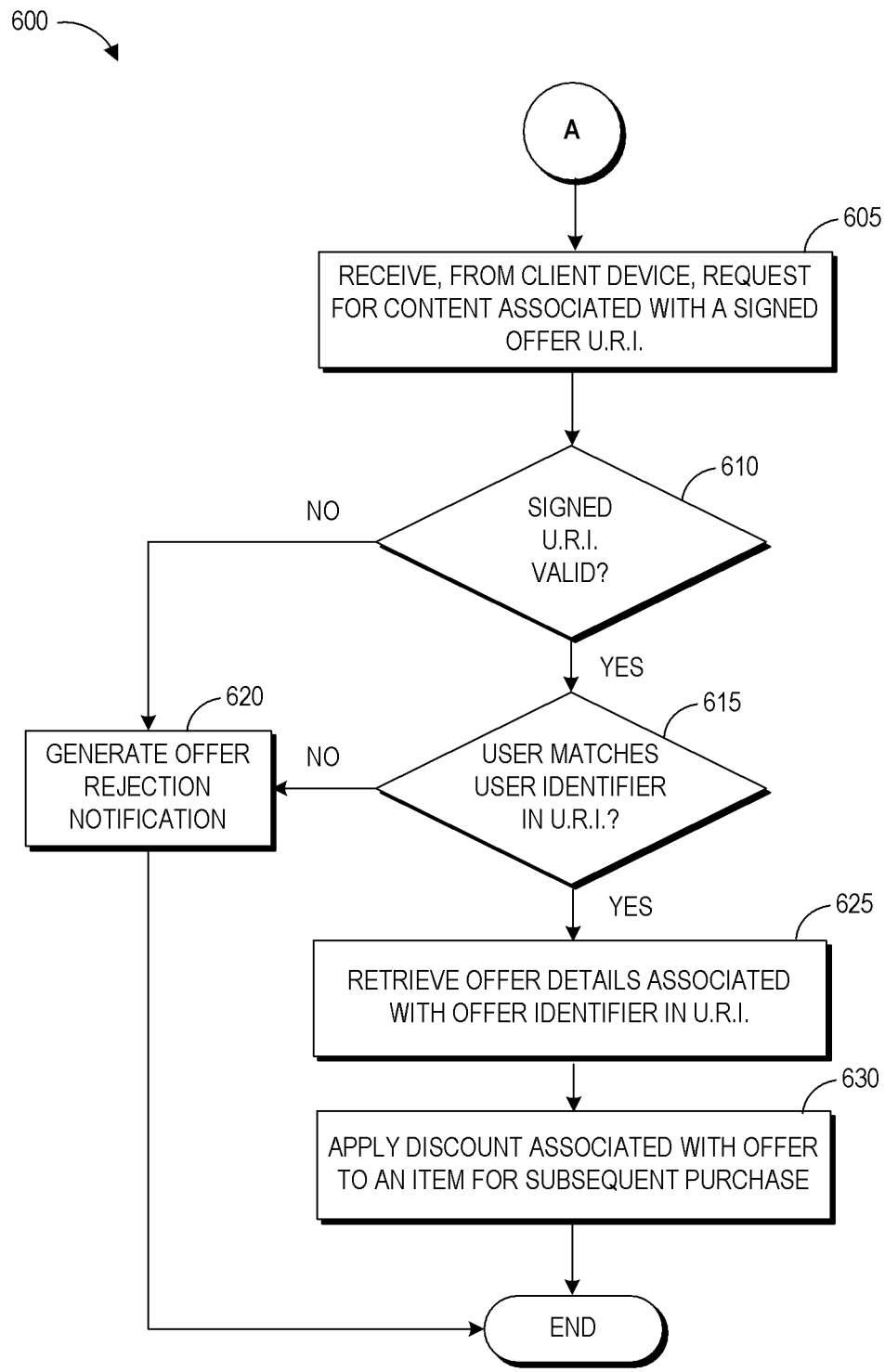
FIG. 6 is a flow diagram depicting an illustrative method for validating a signed identifier and applying its associated item discount.

FIG. 6 is a flow diagram depicting an illustrative method 600 implemented by the offer service 310 for validating a signed identifier and applying its associated item discount. The illustrative method 600 may be implemented following implementation of method 500, discussed above, such that block 605 occurs subsequent to block 525 described above. At block 605, the offer service 310 may receive, from a client computing device, a request for content associated with a signed offer identifier. For example, the offer service may receive a network request from the client computing device for content associated with a given URI or other identifier as a result of a user selecting a selectable option on a page.

At decisional block 610, the offer service 310 may determine whether the signed identifier received from the client computing device is valid. For example, the offer service 310 may extract the various data components from within the identifier (such as the offer identification information, the user identification information, and the signature). The offer service 310 may then decrypt the signature using a private key that the offer service previously used to encrypt the signature. The offer service may apply an algorithm corresponding to an algorithm that was previously used to generate the signature in order to determine that the signature is consistent with the other data in the identifier. For example, in an embodiment in which the offer service 310 generates signatures that serve as a checksum of the user account identification data and the offer identification data in an identifier, the offer service 310 may determine whether the signature in the received identifier is an appropriate checksum of the user account identification data and the offer identification data in the received identifier.

If the offer service 310 determines at block 610 that the signature is not valid, this may indicate that the identifier was not generated by the offer service or has been altered subsequent to being generated by the offer service. In this case, the illustrative method proceeds to block 620 where an offer rejection notification may be generated and sent to the client computing device for display. If instead the signature is determined to be valid, the method proceeds to decisional block 615, where the offer service 310 determines whether the user account associated with the client computing device matches the user identification data within the received URI or other identifier. For example, the offer service 310 may have received a cookie or other data from the client computing device in association with the page request that enables the offer service to determine a user account currently being accessed by the client computing device (such as via a previous account login). If the user accounts do not match, the illustrative method proceeds to block 620 and generates an offer rejection notification. Otherwise, the illustrative method proceeds to block 625.

At block 625, the offer service 310 retrieves offer details associated with the offer identification data within the received URI or other identifier. The offer details may be retrieved, for example, from the offer data store 336. The retrieved offer details may include, for example, an indication of the item to which the offer applies and the discount associated with the offer. In some embodiments, the offer service 310 may additionally confirm that the offer has not expired, has not reached its maximum number of redemptions, and is not otherwise unable to be redeemed according to the stored offer details. The offer service 310 may then apply the discount associated with the offer to a corresponding item for subsequent purchase by the user. For example, the discount may be applied within the user's account such that it is later applied to the item during an order checkout process, applied within the user's shopping cart, and/or otherwise flagged to be applied towards the user's subsequent purchase, rental, or other use of the item.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   an electronic data store; and
   a hardware processor in communication with the electronic data store, the hardware processor configured to execute computer-executable instructions to at least:
      receive item offer information for an item offer, wherein the item offer information identifies (a) an item, (b) a discount, and (c) eligible user criteria;
      determine a user account that matches the eligible user criteria, wherein the user account is identified based at least in part on item purchase history information associated with the user account;
      generate a Uniform Resource Identifier (URI) that includes data identifying the item offer and data identifying the user account;
      generate a cryptographic signature, wherein the cryptographic signature comprises a checksum or a hash value that is generated based at least in part on the data identifying the item offer and the data identifying the user account;
      add the cryptographic signature as alphanumeric text within the URI to form a signed URI;
      generate a page for display by a client computing device, wherein the page includes information regarding the item and a selectable option to apply the discount to the item, wherein code of the page associates the selectable option with the signed URI;
      based on (a) user selection of the selectable option within the page and (b) a portion of the code of the page that is configured to cause a browser displaying the page to send a request to the system for content associated with the signed URI upon the user selection of the selectable option, receive the signed URI from the browser operating on the client computing device in association with a request from the client computing device for content associated with the signed URI;
      validate the signed URI as received from the client computing device based at least in part on the cryptographic signature within the signed URI as received from the client computing device, wherein validation represents that the signed URI as received from the client computing device was generated by the system and has not been altered subsequent to being generated by the system;
      determine that the client computing device is associated with the user account identified in the signed URI; and
      based on both (a) validation of the signed URI as received from the client computing device and (b) determination that the client computing device is associated with the user account identified in the signed URI, apply the discount associated with the item offer information to the item within one of an electronic shopping cart or an order associated with the user account.

2. The system of claim 1, wherein the user account is determined based at least in part on a determination that the item purchase history information associated with the user account includes a previous purchase of the item identified in the item offer information.

3. The system of claim 1, wherein the client computing device is determined to be associated with the user account identified in the signed URI based at least in part on a cookie received from the client computing device.

4. The system of claim 1, wherein the cryptographic signature is a hash value generated based on the data identifying the item offer and the data identifying the user account.

5. The system of claim 1, wherein the eligible user criteria is met by each of a plurality of user accounts, wherein the hardware processor is further configured to generate a different unique Uniform Resource Identifier associated with the item offer for each of the plurality of user accounts that meet the eligible user criteria.

6. The system of claim 1, wherein the hardware processor is further configured to determine, prior to applying the discount, that an offer limit associated with the offer details has not been exceeded.

7. The system of claim 1, wherein the cryptographic signature is a hash value and is generated based in further part on a private key.

8. A computer-implemented method comprising:
   as implemented by at least one computing device configured with specific executable instructions,
      receiving item offer information for an item offer, wherein the item offer information identifies (a) an item, (b) a discount, and (c) eligible user criteria;
      determining a user account that meets the eligible user criteria;
      generating a Uniform Resource Identifier (URI) that includes data identifying the item offer and data identifying the user account, wherein the URI further includes a signature, wherein the signature comprises a checksum or a hash value that is generated based at least in part on the data identifying the item offer and the data identifying the user account;
      generating a page for display by a second computing device, wherein the page includes information regarding the item and a selectable option to apply the discount to the item, wherein the selectable option is associated in code of the page with the URI;
      based on (a) user selection of the selectable option within the page and (b) a portion of the code of the page that is configured to cause a browser displaying the page to send a network request for content associated with the URI upon the user selection of the selectable option, receiving the URI from the browser operating on the second computing device, wherein the second computing device is different than the at least one computing device that generated the URI;

based at least in part on an analysis of the signature in the URI as received from the second computing device, confirming that the data identifying the user account within the URI as received from the second computing device has not been modified;

determining that the second computing device is associated with the user account identified in the URI; and applying the discount associated with the item offer information to the item.

9. The computer-implemented method of claim 8, wherein the analysis of the signature includes decrypting the signature based at least in part on a private key value.

10. The computer-implemented method of claim 8, wherein the Uniform Resource Identifier is a Uniform Resource Locator.

11. The computer-implemented method of claim 8, wherein the URI further comprises one of: a time at which the URI was generated, or an expiration time associated with the URI.

12. The computer-implemented method of claim 8, wherein the user account that meets the eligible user criteria is determined based at least in part on item purchase history information associated with the user account.

13. The computer-implemented method of claim 12, wherein the user account that meets the eligible user criteria is determined based at least in part on a determination that the item purchase history information associated with the user account includes a previous purchase of the item identified in the item offer information.

14. The computer-implemented method of claim 12, wherein the user account that meets the eligible user criteria is determined based at least in part on a determination that the item purchase history information associated with the user account includes a previous purchase of an item associated with a company identified in the eligible user criteria.

15. The computer-implemented method of claim 12, wherein the user account that meets the eligible user criteria is determined based at least in part on a determination that the item purchase history information associated with the user account includes a previous purchase of one or more items identified in the eligible user criteria.

16. The computer-implemented method of claim 8, wherein the discount is one of a dollar amount or a percentage.

17. The computer-implemented method of claim 8, wherein the signature is a hash value generated based on the data identifying the item offer and the data identifying the user account.

* * * * *